(12) United States Patent
Daniels et al.

(10) Patent No.: US 9,783,733 B2
(45) Date of Patent: Oct. 10, 2017

(54) PREPARATION OF QUANTUM DOT BEADS HAVING A SILYL SURFACE SHELL

(71) Applicant: Nanoco Technologies, Ltd., Manchester (GB)

(72) Inventors: Siobhan Daniels, Derbyshire (GB); Imad Naasani, Manchester (GB)

(73) Assignee: Nanoco Technologies Ltd., Manchester (GB)

( * ) Notice: Subject to any disclaimer, the term of this patent is extended or adjusted under 35 U.S.C. 154(b) by 231 days.

(21) Appl. No.: 14/210,070

(22) Filed: Mar. 13, 2014

(65) Prior Publication Data

US 2014/0264193 A1   Sep. 18, 2014

Related U.S. Application Data

(60) Provisional application No. 61/788,007, filed on Mar. 15, 2013.

(51) Int. Cl.
| | |
|---|---|
| *H01B 1/06* | (2006.01) |
| *C09K 11/02* | (2006.01) |
| *B82Y 40/00* | (2011.01) |

(52) U.S. Cl.
CPC ............... *C09K 11/02* (2013.01); *B82Y 40/00* (2013.01); *Y10S 977/779* (2013.01)

(58) Field of Classification Search
CPC ...... C09K 11/02; B82Y 40/00; Y10S 977/779
USPC ........ 252/519.31, 519.33, 500, 518.1, 301.6; 977/779, 774, 773, 890, 896; 257/301.36, 257/9, 793, 13, 98
See application file for complete search history.

(56) References Cited

U.S. PATENT DOCUMENTS

| | | | |
|---|---|---|---|
| 7,544,725 B2 | 6/2009 | Pickett et al. | |
| 7,674,844 B2 | 3/2010 | Pickett et al. | |
| 7,788,828 B2 | 9/2010 | Krouse | |
| 2003/0148544 A1* | 8/2003 | Nie | B82Y 15/00 |
| | | | 436/524 |
| 2007/0238126 A1 | 10/2007 | Pickett et al. | |
| 2010/0123155 A1 | 5/2010 | Pickett et al. | |
| 2011/0068321 A1 | 3/2011 | Pickett et al. | |
| 2011/0068322 A1* | 3/2011 | Pickett | C09K 11/02 |
| | | | 257/13 |
| 2011/0084322 A1 | 4/2011 | Kang | |
| 2012/0256141 A1* | 10/2012 | Nick | C08K 9/10 |
| | | | 252/519.21 |

* cited by examiner

*Primary Examiner* — Irina S Zemel
(74) *Attorney, Agent, or Firm* — Blank Rome, LLP

(57) ABSTRACT

Quantum dots (QDs) are encapsulated within microbeads having a silyl surface shell. The microbeads are prepared by copolymerizing unsaturated resins and an unsaturated organosilane in the presence of QDs. During the copolymerization, the unsaturated resin and the organosilane phase separate, forming beads having a silyl surface shell surrounding an essentially unsilylated interior. The QDs are encapsulated within the interior. The silyl shell provides a barrier against oxygen and other contaminants diffusing into the bead and reacting with the QDs.

7 Claims, 3 Drawing Sheets

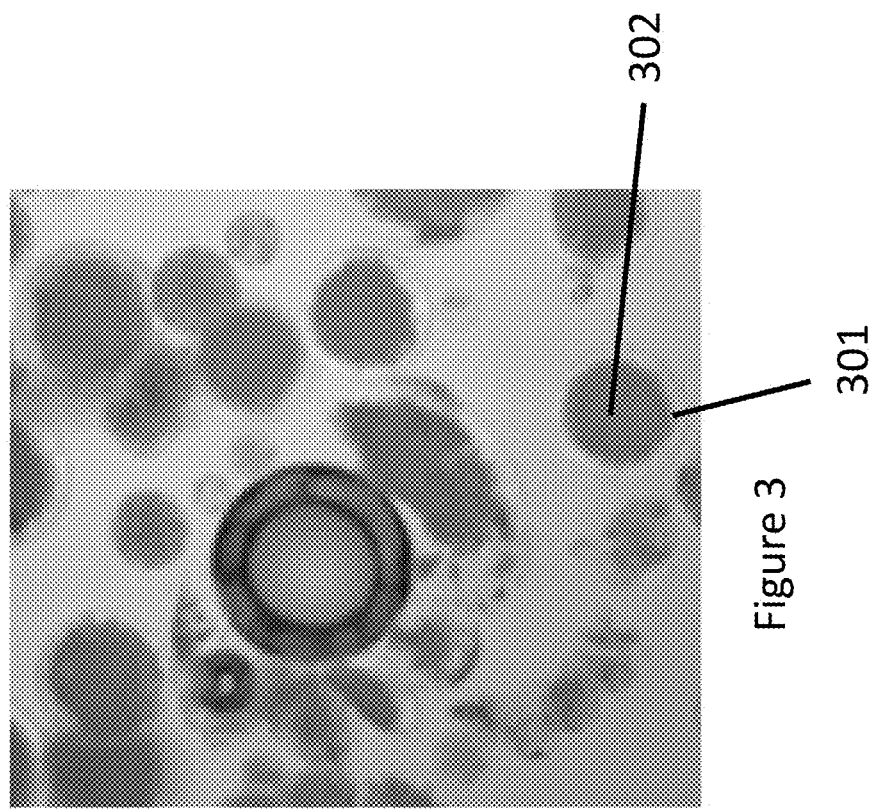

PREPARATION OF QUANTUM DOT BEADS HAVING A SILYL SURFACE SHELL

CROSS-REFERENCE TO RELATED APPLICATIONS

This application is a non-provisional of Provisional U.S. Patent Application 61/788,007, filed Mar. 15, 2013, the entire contents of which are incorporated herein by reference.

BACKGROUND

1. Field of the Invention

This invention relates to nanoparticles. More particularly, it relates to quantum dot microbeads having a surface shell.

2. Description of the Related Art Including Information Disclosed Under 37 CFR 1.97 and 1.98.

There has been substantial interest in the preparation and characterization of compound semiconductors in the form of particles with dimensions in the order of 2-50 nanometers (nm), often referred to as quantum dots (QDs), nanoparticles, or nanocrystals. Interest has arisen mainly due to the size-related electronic properties of these materials that can be exploited in many commercial applications such as optical and electronic devices, biological labeling, solar cells, catalysis, biological imaging, light-emitting diodes, general space lighting, and electroluminescent and photoluminescent displays.

Two fundamental factors, both related to the size of the individual semiconductor nanoparticle, are responsible for their unique properties. The first is the large surface-to-volume ratio: for smaller particles, the ratio of the number of surface atoms to the number of interior atoms is large. Thus, surface properties play an important role in the overall properties of the material. Also, the electronic properties of the material changes with size. For example, the band gap is larger for smaller particles because increased carrier confinement gives rise to discrete energy levels similar to those observed in atoms and molecules, rather than the continuous band of the corresponding bulk semiconductor material.

Among the most studied semiconductor quantum dot materials have been the chalcogenide II-VI materials, namely zinc sulfide (ZnS), zinc selenide (ZnSe), cadmium sulfide (CdS), cadmium selenide (CdSe), cadmium telluride (CdTe). Reproducible quantum dot production methods have been developed from "bottom-up" techniques, whereby particles are prepared atom-by-atom, i.e. from molecules to clusters to particles, using wet chemical procedures.

Coordination about the final inorganic surface atoms of nanoparticles may be incomplete, with highly reactive non-fully coordinated atomic "dangling bonds" on the surface of the particle. Such dangling bonds lead to particle agglomeration. The problem of agglomeration may be overcome by passivating (e.g., capping) the bare surface atoms with protective organic groups.

Single-core semiconductor nanoparticles are generally a single semiconductor material along with an outer organic passivating layer. Single-core nanoparticles tend to have relatively low quantum efficiencies because of non-radiative electron-hole recombination occurring at defects and dangling bonds situated on the nanoparticle surface.

One method to eliminate such defects and dangling bonds is growing a second inorganic material on the surface of the core particle to produce a "core-shell" nanoparticle. Generally, the second inorganic material has a wider bandgap than the core material and also has a small lattice mismatch to that of the core material. Core-shell nanoparticles separate carriers confined in the core from surface states that would otherwise act as non-radiative recombination centers. The small lattice mismatch between the core and shell materials also minimizes non-radiative recombination. One example of a core-shell nanoparticle is ZnS grown on the surface of CdSe cores.

Another approach to maximizing quantum efficiency is growing a core-multi shell structure where the electron-hole pair is completely confined to a single shell layer. In these structures, the core is of a wide bandgap material, surrounded by a thin shell of narrower bandgap material, and capped with a further wide bandgap layer, such as CdS/HgS/CdS. In such a structure, a few monolayers of mercury sulfide (HgS) are formed on the surface of the core CdS nanocrystal and then capped by additional CdS. The resulting structures exhibit clear confinement of photo-excited carriers in the narrower bandgap HgS layer.

The outermost layer of organic material (i.e., the capping agent) helps to inhibit particle aggregation and also protects the nanoparticle from the surrounding chemical environment. In many cases, the capping agent is the solvent in which the nanoparticle preparation is undertaken, typically a Lewis base compound or a Lewis base compound diluted in an inert solvent such as a hydrocarbon. The capping agent can include a lone pair of electrons that are capable of donor-type coordination to the surface of the nanoparticle. Examples may include mono- or multi-dentate ligands of the types: phosphines (trioctylphosphine, triphenolphosphine, t-butylphosphine), phosphine oxides (trioctylphosphine oxide), alkyl phosphonic acids, alkyl-amine (hexadecylamine, octylamine), aryl-amines, pyridines, long chain fatty acids, and thiophenes. Alternatively, capping agent may include a functional group that bonds directly to the outermost inorganic layer. An example of such a capping agent is a thiol, wherein the —SH is capable of bonding to the QD.

The capping agent of a QD may also be a coordinated ligand that processes additional functional groups that can be used as chemical linkage to other inorganic, organic or biological material. Such functional groups may point away from the QD surface and be available to bond/react with other available molecules, such as primary, secondary amines, alcohols, carboxylic acids, azides, or hydroxyl groups. Moreover, the capping agent may include polymerizable functionalities, which may be polymerized to form a polymer around the QD particle.

The most widely studied quantum dots presently are based on cadmium-containing semiconductors such as CdS and/or CdSe. However, in many regions of the world there is now a restriction or ban on the use of heavy metals in many household goods which means that most cadmium-based quantum dots are unusable for consumer-goods applications.

It is thus commercially important to develop a range of heavy metal-free QDs that exhibit bright emissions in the visible and near infra-red region of the spectrum and that have similar optical properties to those of CdSe quantum dots. However, cadmium-free QD materials have proven to be more difficult to work with than their cadmium-containing counterparts. Specifically, cadmium-free materials are more sensitive to reactions with their environment, which cause a drop in quantum yield of the emission. It is thus desirable to develop systems that protect cadmium-free QDs from reacting with their environment.

One method of protecting QDs from their chemical environment has been to encapsulate the QDs within microbeads of a polymer material. Examples of microbead-encapsulated QDs are described in Applicant's U.S. Pat. No. 7,544,725, issued Jun. 9, 2009 and U.S. Pat. No. 7,674,844, issued Mar. 9, 2010, and in Applicant's Application Pub. Nos. U.S. 2011/0068321 and U.S. 2011/0084322, both published Mar. 24, 2011. The entire content of those patents and applications are incorporated herein by reference. While encapsulating QDs within polymer microbeads have shown to improve the stability and optical performance of the QDs, it has proven difficult to provide polymer systems that are both compatible with the QDs and that also efficiently protect the QDs from oxygen and other reactants. There is thus a need for further systems for protecting QDs from their environment.

SUMMARY

Quantum dots (QDs) are encapsulated within microbeads having a silyl surface shell. The microbeads are prepared by copolymerizing unsaturated resins and an unsaturated organosilane in the presence of QDs. During the copolymerization, the unsaturated resins and the organosilane phase separate, forming beads having a silyl surface shell surrounding an essentially unsilylated interior. The QDs are encapsulated within the interior. The silyl shell provides a barrier against oxygen and other contaminants diffusing into the bead and reacting with the QDs.

DESCRIPTION OF THE DRAWING(S)

The patent or application file contains at least one drawing executed in color. Copies of this patent or patent application publication with color drawing(s) will be provided by the Office upon request and payment of the necessary fee.

FIG. 3 is a photomicrograph of QD-containing microbeads.

DESCRIPTION

The disclosure may best be understood by reference to the exemplary embodiments disclosed herein. Disclosed herein are QD-containing microbeads having a silyl surface shell. In a strict sense, the silyl group is $H_3Si-$. As used herein, the name is also applied to hydrocarbyl derivatives of the silyl group.

Figure 1:
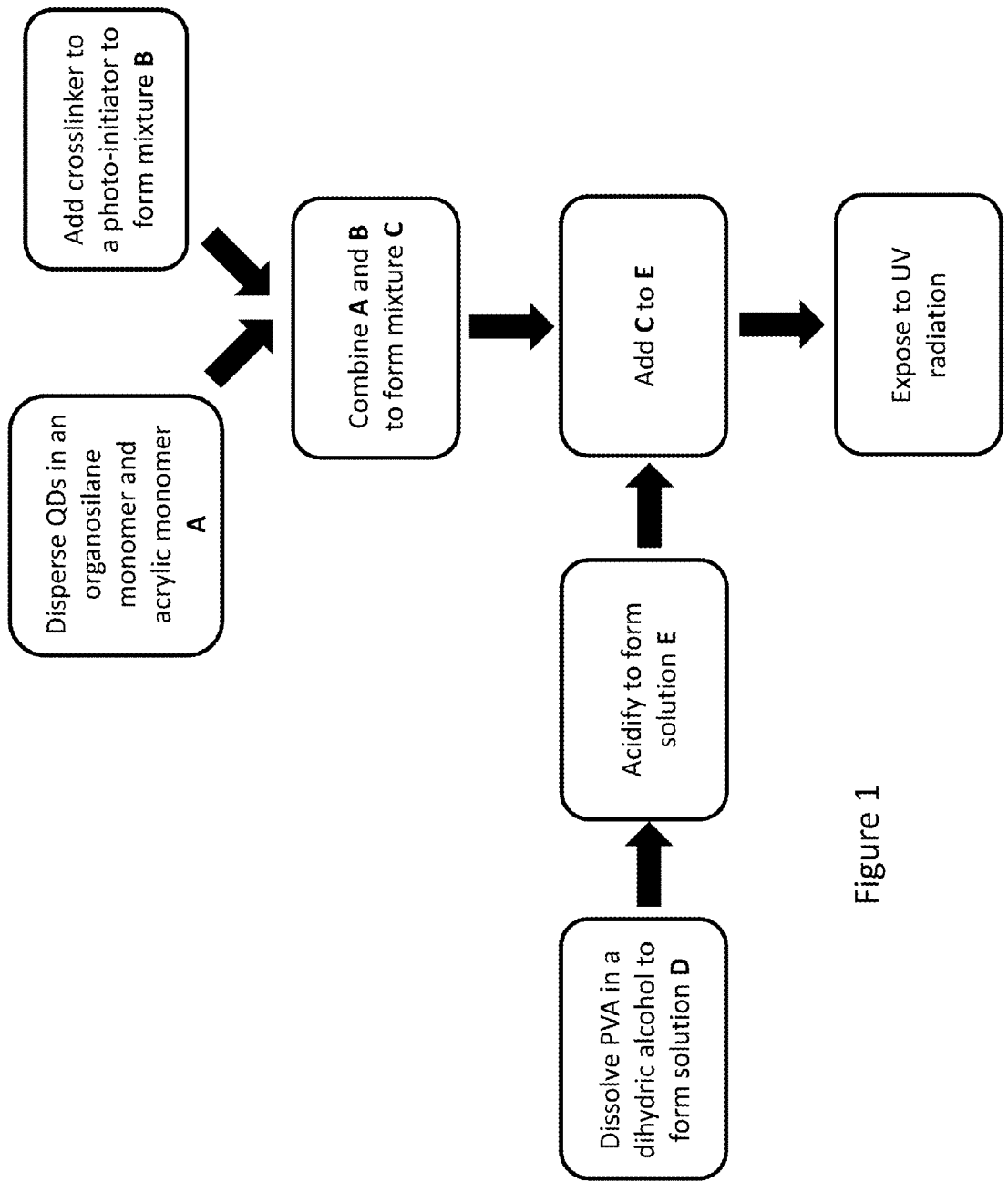
FIG. 1 is a flowchart illustrating a process for encapsulating QDs in a silyl-based shell.

FIG. 1 is a flowchart that illustrates a process for encapsulating QDs within microbeads having a silyl surface shell. A first mixture is prepared by dispersing QDs in a solvent containing organosilane monomer and another unsaturated monomer, such as an acrylic monomer. It should be noted that other monomers, such as epoxides may be used instead of, or in addition to an acrylic monomer.

The methods described herein can be practiced with any type of QD but are particularly well suited for processing heavy metal-free QDs. Examples include QDs having a core based on InP, which optionally incorporate additional elements, such as zinc and sulfur. Examples of such QDs include core/shell QDs, such as described in Applicant's U.S. Pat. No. 7,788,828, issued Sep. 15, 2009, the entire contents of which are incorporated herein by reference. That patent describes core/shell QDs comprising an InP-based semiconductor material formed on a molecular cluster compound containing zinc and sulfur. One or more layers are formed ion the core material, for example, a layer of ZnS semiconductor material.

An example of a suitable organosilane monomer is 3-(trimethoxysilyl)propyl methacrylate (TMSPM). Examples of suitable acrylic monomers include lauryl methacrylates (LMA), ethyl acrylates, methyl methacrylates, ethyl acrylates, ethyl methacrylates, propyl acrylates, propyl methacrylates, isopropyl acrylates, isopropyl methacrylates, butyl acrylates, butyl methacrylates, isobutyl acrylates, isobutyl methacrylates, tert-butyl acrylates, tert-butyl methacrylates, octyl acrylates, octyl methacrylates, undecyl acrylates, undecyl methacrylates, octadecyl acrylates, octadecyl methacrylates, dodecyl acrylates, dodecyl methacrylates, 2-ethylhexyl acrylates, 2-ethylhexyl methacrylates, isobornyl acrylates, isobornyl methacrylates, lauryl acrylates, 2-hydroxyethyl acrylates, 2-hydroxyethyl methacrylates, glycidyl acrylates, glycidyl methacrylates, poly(ethylene glycol)acrylates, poly(ethylene glycol)methacrylates, poly (ethylene glycol) methyl ether acrylates, poly(ethylene glycol) methyl ether methacrylates, poly(ethylene glycol) behenyl ether acrylates, poly(ethylene glycol) behenyl ether methacrylates, poly(ethylene glycol) 4-nonylphenyl ether acrylates, poly(ethylene glycol) 4-nonylphenyl ether methacrylates, poly(ethylene glycol) phenyl ether acrylates, poly (ethylene glycol) phenyl ether methacrylates, vinyl acetates, vinyl propionates, and combinations of two or more thereof.

In parallel, a second mixture is prepared containing a photoinitiator and a cross-linking agent. An example of a suitable cross-linking agent is Trimethylolpropane trimethacrylate (TMPTM). Suitable photoinitiators include bis(2,4, 6-trimethylbenzoyl)-phenylphosphineoxide (4.5 mg) (IRGACURE® 819 by Ciba Specialty Chemicals, Inc.).

The first and second mixtures are combined and to that combined mixture can be added an acidified solution of acidified polyvinyl alcohol (PVA). The combination of QDs, PVA, organosilane monomer, acrylic monomer, cross-linking agent, and photoinitiator are exposed to radiation (e.g., UV light or broad-spectrum light) while stirring to initiate polymerization and form microbeads encapsulating the QDs.

It has been discovered that during polymerization the silyl-containing monomers and the non-silyl-containing monomers separate, yielding microbeads having a silyl surface shell surrounding a polymer core. The QDs are encapsulated within the core. Generally, the resulting microbeads can be about 0.2 to about 1000 microns in diameter and the silyl surface shell can be about 0.01 to about 300 microns in thickness. The ratio of organosilane monomer to acrylic monomer and polymerization parameters such as pH, surfactant, etc., can be adjusted to control the thickness of the silyl surface shell on the resulting microbeads. The correlation of those factors with shell thickness can be determined by trial and error without undue experimentation.

EXAMPLES

Example 1. Quantum Dot Microbeads Having a Thin Silyl Shell

InP alloyed QDs (47.5 mg) were prepared as described in Applicant's U.S. Pat. No. 7,788,828, issued Sep. 15, 2009, the entire contents of which are incorporated herein by reference. The QDs were evaporated to dryness under vacuum. The dot residue was then dissolved in degassed lauryl methacrylate (LMA) (0.73 ml) and degassed 3-(trimethoxysilyl) propyl methacrylate (TMSPM) (0.2 ml).

Trimethylolpropane trimethacrylate (TMPTM) (0.5 ml) was added to a photoinitiator of bis(2,4,6-trimethylbenzoyl)-phenylphosphineoxide (4.5 mg) (IRGACURE® 819 by Ciba Specialty Chemicals, Inc.) and stirred in the dark until dissolved and then thoroughly degassed. A 2% wt/volume solution of polyvinyl alcohol (PVA) (2 g)/water (100 ml) was made up by heating the solution to 60° C. overnight under nitrogen until the solid PVA was dissolved. This stock solution was then allowed to cool and then acidified with 1M hydrochloric acid to a pH of 1.9. Five milliliters of this solution were then transferred to the reaction vessel and thoroughly degassed.

Figure 2:
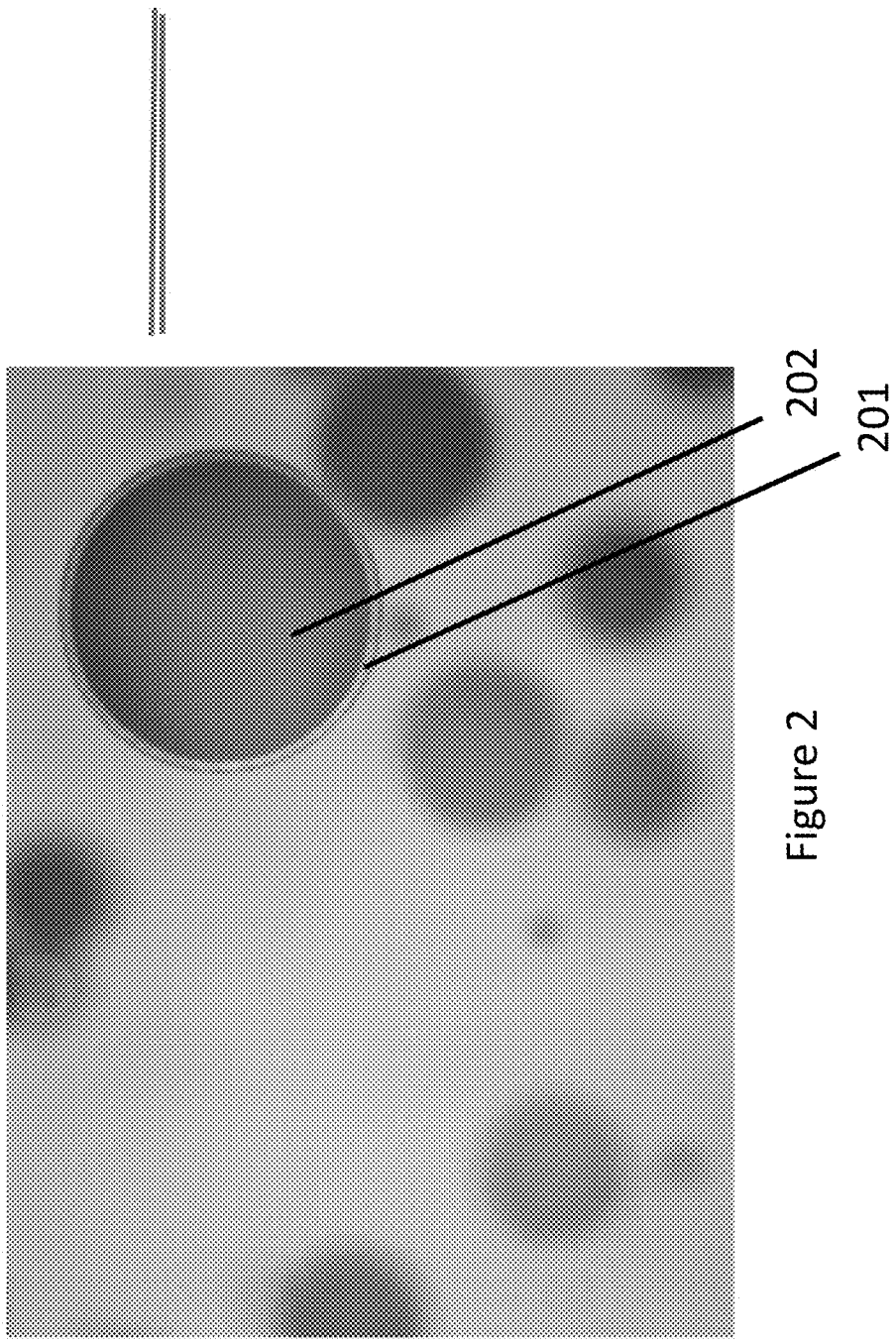
FIG. 2 is a photomicrograph of QD-containing microbeads.

The QD/LMA/TMSPM solution was combined with the TMPTM/photo-initiator solution and protected from the light while being stirred to ensure complete mixing (5 min.). The 2% solution of acidified PVA(aq) was then stirred at 1500 rpm and the QD/LMA/TMSPM/TMPTM/photo-initiator mixture added. The solution was allowed to equilibrate for two minutes and then exposed to the output of a broad-spectrum mercury lamp for 5 minutes. The resulting QD microbeads were washed with water and ethanol and dried under vacuum. FIG. 2 is a photomicrograph of QD-containing microbeads prepared as above and having relatively thin silyl shells 201, which is visible on the microbead 202. For reference microbead 202 is about 200 μm in diameter total and silyl surface shell 201 is about 10 μm thick.

Example 2. Quantum Dot Microbeads Having a Thick Silyl Shell

InP-based QDs (47.5 mg), prepared as in the previous example, were evaporated to dryness under vacuum. The resulting dot residue was then dissolved in degassed Lauryl methacrylate (LMA) (0.49 ml) and degassed 3-(trimethoxysilyl) propyl methacrylate (TMSPM) (0.40 ml). Trimethylolpropane trimethacrylate (TMPTM) (0.5 ml) was added to the photo-initiator (4.5 mg) (Irgacure® 819 by Ciba Specialty Chemicals, Inc.) and stirred in the dark until dissolved and then thoroughly degassed. A 2% wt/volume solution of polyvinyl alcohol (PVA) (2 g)/water (100 ml) was made up by heating the solution to 60° C. overnight under nitrogen until the PVA was dissolved. This stock solution was then allowed to cool and subsequently acidified with 1M hydrochloric acid to a pH of 1.9. Five milliliters of this solution were then transferred to the reaction vessel and thoroughly degassed.

The QD/LMA/TMSPM solution was combined with the TMPTM/photo-initiator solution and protected from the light while being stirred to ensure complete mixing (5 min). The 2% solution of acidified PVA(aq) was then stirred at 1500 rpm while the QD/LMA/TMSPM/TMPTM/photo-initiator mixture was added. The resulting solution was allowed to equilibrate for two minutes and then exposed to the output of a broad-spectrum mercury lamp for 5 minutes. The resulting CFQD microbeads were washed with water and ethanol and dried under vacuum.

FIG. 3 is a photomicrograph of QD-containing microbeads having relatively thick silyl shells 301 visible on microbead 302. For reference microbead 302 is about 200 μm in diameter total and silyl surface shell 301 is about 40 μm thick.

It is contemplated that the practice of the invention should allow the surface of quantum dot microbeads to be tailored to produce microbeads that are compatible with many different environments.

Other polymerizable acrylic monomers such as acrylic acid, methacrylic acid, esters of these acids or acrylonitrile may be substituted for the lauryl methacrylate (LMA).

Although the invention has been described in detail with reference to certain preferred embodiments, variations and modifications exist within the scope and spirit of the disclosed embodiments. It will be appreciated that at least the following has been described.

We claim:

1. A method for preparing quantum dot-containing microbeads, the method comprising:
   preparing a mixture comprising quantum dots (QDs), 3-(trimethoxysilyl) propyl methacrylate, an acrylic monomer, a cross-linking agent, and an initiator,
   polymerizing the mixture to form polymer microbeads having a silyl surface shell,
   wherein during polymerization the acrylic monomer and 3-(trimethoxysilyl) propyl methacrylate undergo phase separation.

2. The method of claim 1, wherein the mixture further comprises polyvinyl alcohol.

3. The method of claim 1, wherein the acrylic monomer is lauryl methacrylate.

4. The method of claim 1, wherein the cross-linking agent is trimethylol propane trimethacrylate.

5. The method of claim 1, wherein the QDs comprise a core semiconductor material comprising indium and phosphorus.

6. A method as recited in 2 wherein the ratio of the acrylic monomer to 3-(trimethoxysilyl) propyl methacrylate is about 1:1 to about 4:1 by volume.

7. The method of claim 1, wherein the initiator is bis(2, 4,6-trimethylbenzoyl)-phenylphosphineoxide.

* * * * *